United States Patent
Samusevich et al.

(10) Patent No.: US 11,692,723 B2
(45) Date of Patent: Jul. 4, 2023

(54) PREDICTIVE MAINTENANCE CONVOLUTIONAL NEURAL NETWORKS

(71) Applicant: Honeywell International Inc., Morris Plains, NJ (US)

(72) Inventors: Raman Samusevich, Prague (CZ); Karel Marik, Revnice (CZ); Petr Endel, Prague (CZ)

(73) Assignee: Honeywell International Inc., Morris Plains, NJ (US)

( * ) Notice: Subject to any disclaimer, the term of this patent is extended or adjusted under 35 U.S.C. 154(b) by 317 days.

(21) Appl. No.: 16/816,384

(22) Filed: Mar. 12, 2020

(65) Prior Publication Data

US 2021/0285672 A1    Sep. 16, 2021

(51) Int. Cl.
| F24F 11/32 | (2018.01) |
| F24F 11/63 | (2018.01) |
| G06N 20/00 | (2019.01) |
| G06N 3/084 | (2023.01) |

(52) U.S. Cl.
CPC .............. *F24F 11/32* (2018.01); *F24F 11/63* (2018.01); *G06N 3/084* (2013.01); *G06N 20/00* (2019.01)

(58) Field of Classification Search
None
See application file for complete search history.

(56) References Cited

U.S. PATENT DOCUMENTS

| 2019/0235484 A1 | 8/2019 | Ristovski et al. | |
| 2020/0042954 A1* | 2/2020 | Parris | G06N 3/08 |
| 2020/0322703 A1* | 10/2020 | Bures | G06N 20/00 |
| 2020/0379454 A1* | 12/2020 | Trinh | G06N 3/0454 |
| 2021/0071897 A1* | 3/2021 | Casa | F24F 11/52 |
| 2021/0073449 A1* | 3/2021 | Segev | G06N 5/025 |
| 2021/0247757 A1 | 8/2021 | Bergs et al. | |

FOREIGN PATENT DOCUMENTS

| EP | 3611588 A1 | 2/2020 |
| WO | 2019/035986 A1 | 2/2019 |

OTHER PUBLICATIONS

Selvaraju et al., Grad-CAM: Visual Explanations from Deep Networks via Gradient-Based Localization, 2016, [online article] [retrieved on May 11, 2020] retreived from the Internet URL: https://arxiv.org/abs/1610.02391, 23 pages.

(Continued)

*Primary Examiner* — Nathan L Laughlin
(74) *Attorney, Agent, or Firm* — Alston & Bird LLP

(57) ABSTRACT

Systems and methods provide techniques for performing predictive maintenance data analysis based on telemetry data. In one embodiments, a method includes at least operations configured to obtain a training telemetry data object, determine a training input data object based on the training telemetry data object, obtain a maintenance data object, and generate a trained predictive maintenance convolutional neural network based on the training input data object and the maintenance data object. The trained predictive maintenance convolutional neural network can be utilized to generate maintenance predictions for a monitored system. The maintenance prediction can include data objects with visual explanatory capabilities, such as data objects that describe heatmaps over input telemetry data.

20 Claims, 9 Drawing Sheets

(56) References Cited

OTHER PUBLICATIONS

Springenberg et al., Striving for Simplicity: The All Convolutional Net, 2015 [online article] [retrieved on May 11, 2020] retrieved from the Internet URL: https://arxiv.org/abs/1412.6806, 14 pages.
International Preliminary Report on Patentability received for WO Application No. PCT/US2021/020879, dated Sep. 6, 2022, 8 pages.
International Search Report and Written Opinion of the ISA received for WO Application No. PCT/US2021/020879, dated Jun. 17, 2021, 11 pages.

\* cited by examiner

| REPORTED DATE | |
|---|---|
| 10/03/2016 | 18:08 | — 801
| 01/02/2017 | 16:43 | — 802
| 01/02/2017 | 16:53 | — 803
| 06/14/2017 | 17:00 | — 804
| 08/02/2017 | 18:42 |
| 08/18/2017 | 16:41 |
| 06/11/2017 | 15:52 |
| 10/16/2016 | 18:10 |
| 11/27/2016 | 19:27 |
| 12/07/2016 | 05:33 |
| 01/01/2017 | 17:35 |

PREDICTIVE MAINTENANCE CONVOLUTIONAL NEURAL NETWORKS

BACKGROUND

Various methods, apparatuses, and systems are configured to provide techniques for performing predictive maintenance data based on telemetry data.

BRIEF SUMMARY

In general, embodiments disclosed herein provide methods, apparatuses, systems, computing devices, and/or the like that are configured to enable performing predictive maintenance data based on telemetry data. For example, certain embodiments disclosed herein provide methods, apparatuses, systems, computing devices, and/or the like that are configured to perform predictive maintenance data based on telemetry data using at least one of predictive maintenance convolutional neural networks, maintenance data objects, per-sensor predictive input channels, and per-input-channel heatmaps.

In accordance with one aspect, a method is provided. In one embodiment, the method comprises: obtaining a training telemetry data object for the monitored system; determining, based on the training telemetry data object, a training input data object, wherein the training input data object comprises one or more training input channels, and wherein each training input channel of the one or more training input channels is associated with a sensor device of one or more sensor devices, and further wherein each training input channel of the one or more training input channels is determined based on a first subset of a plurality of per-time-unit-per-sensor training measurements that is associated with a sensor device for the training input channel; obtaining a maintenance data object for the monitored system, wherein the maintenance data object identifies one or more maintenance-critical time units of the one or more training time units; and generating, based on the training input data object and the maintenance data object, a trained predictive maintenance convolutional neural network, wherein the trained predictive maintenance convolutional neural network is configured to process a predictive input data object for the monitored system to generate a maintenance prediction for the monitored system.

In accordance with another aspect, a computer program product is provided. The computer program product can comprise at least one computer-readable storage medium having computer-readable program code portions stored therein, the computer-readable program code portions comprising executable portions configured to: obtain a training telemetry data object for the monitored system; determine, based on the training telemetry data object, a training input data object, wherein the training input data object comprises one or more training input channels, and wherein each training input channel of the one or more training input channels is associated with a sensor device of one or more sensor devices, and further wherein each training input channel of the one or more training input channels is determined based on a first subset of a plurality of per-time-unit-per-sensor training measurements that is associated with a sensor device for the training input channel; obtain a maintenance data object for the monitored system, wherein the maintenance data object identifies one or more maintenance-critical time units of the one or more training time units; and generate, based on the training input data object and the maintenance data object, a trained predictive maintenance convolutional neural network, wherein the trained predictive maintenance convolutional neural network is configured to process a predictive input data object for the monitored system to generate a maintenance prediction for the monitored system.

In accordance with yet another aspect, an apparatus comprising at least one processor and at least one memory including computer program code is provided. In one embodiment, the at least one memory and the computer program code can be configured to, with the processor, cause the apparatus to: obtain a training telemetry data object for the monitored system; determine, based on the training telemetry data object, a training input data object, wherein the training input data object comprises one or more training input channels, and wherein each training input channel of the one or more training input channels is associated with a sensor device of one or more sensor devices, and further wherein each training input channel of the one or more training input channels is determined based on a first subset of a plurality of per-time-unit-per-sensor training measurements that is associated with a sensor device for the training input channel; obtain a maintenance data object for the monitored system, wherein the maintenance data object identifies one or more maintenance-critical time units of the one or more training time units; and generate, based on the training input data object and the maintenance data object, a trained predictive maintenance convolutional neural network, wherein the trained predictive maintenance convolutional neural network is configured to process a predictive input data object for the monitored system to generate a maintenance prediction for the monitored system.

BRIEF DESCRIPTION OF THE SEVERAL VIEW OF THE DRAWINGS

Having thus described some embodiments in general terms, references will now be made to the accompanying drawings, which are not drawn to scale, and wherein:

Figure 6:
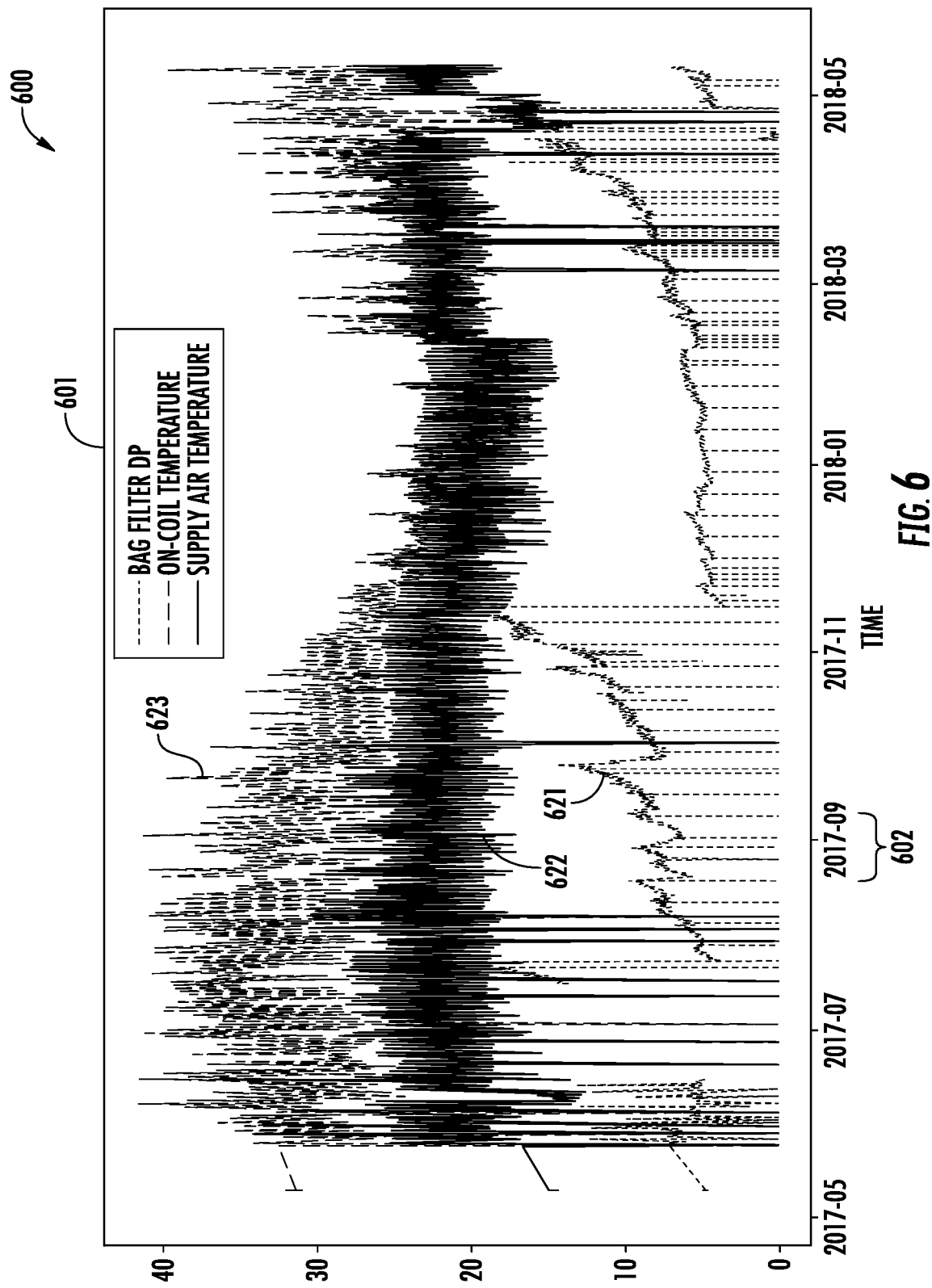

FIG. 6 provides an operational example of a telemetry data object in accordance with at least some embodiments disclosed herein.

Figure 7:
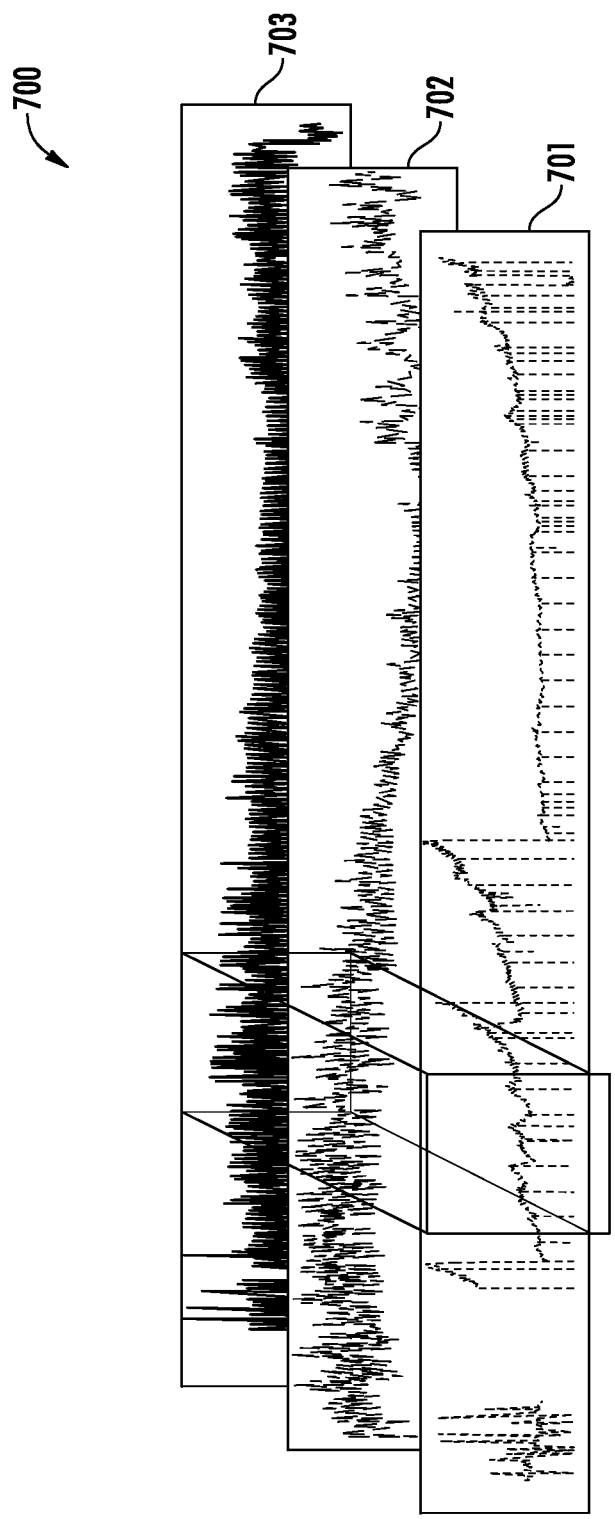

FIG. 7 provides an operational example of an input data object in accordance with at least some embodiments disclosed herein.

FIG. 8 provides an operational example of a maintenance data object in accordance with at least some embodiments disclosed herein.

Figure 9:
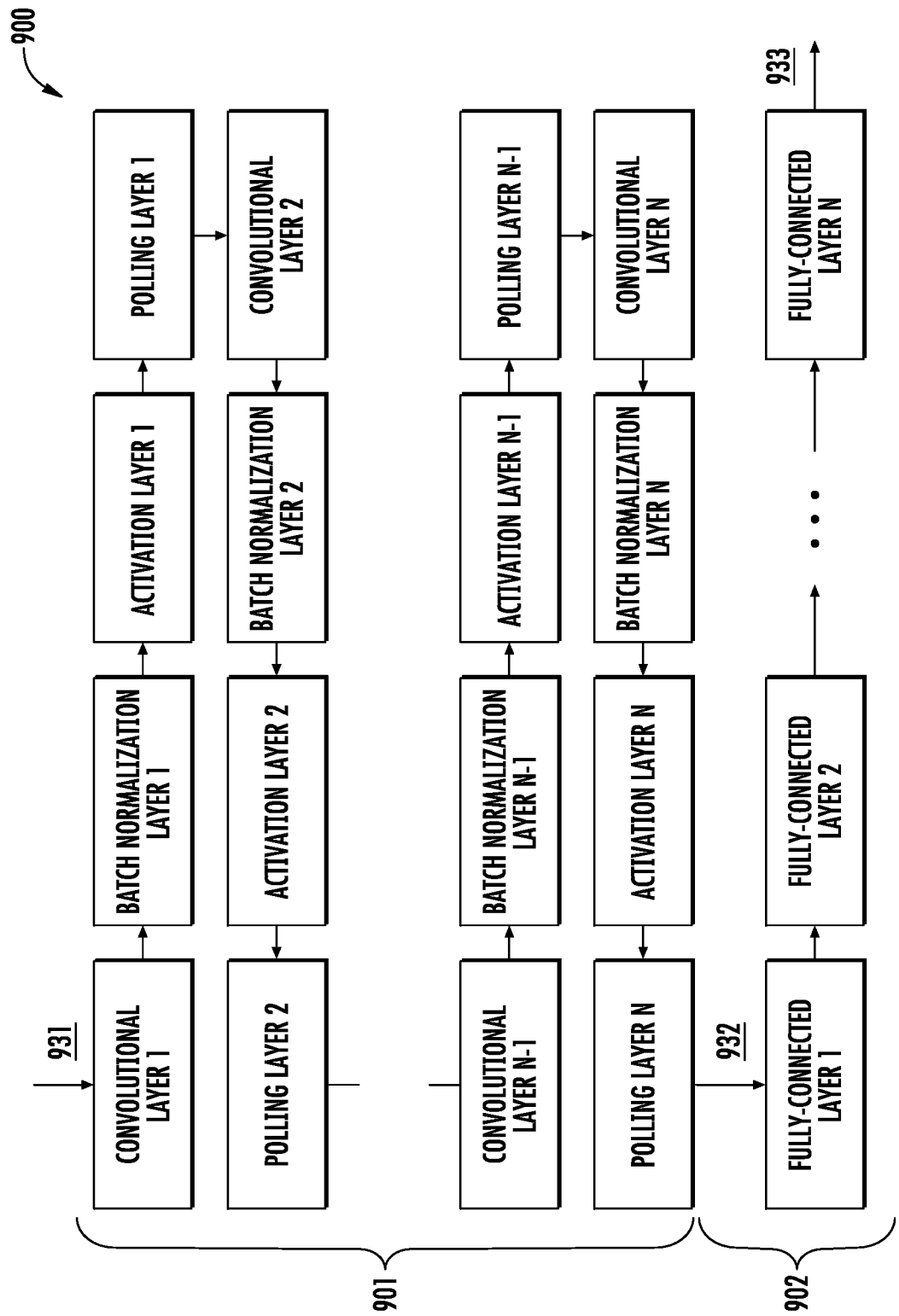

FIG. 9 provides an operational example of a predictive maintenance convolutional neural network in accordance with at least some embodiments disclosed herein.

Figure 10:
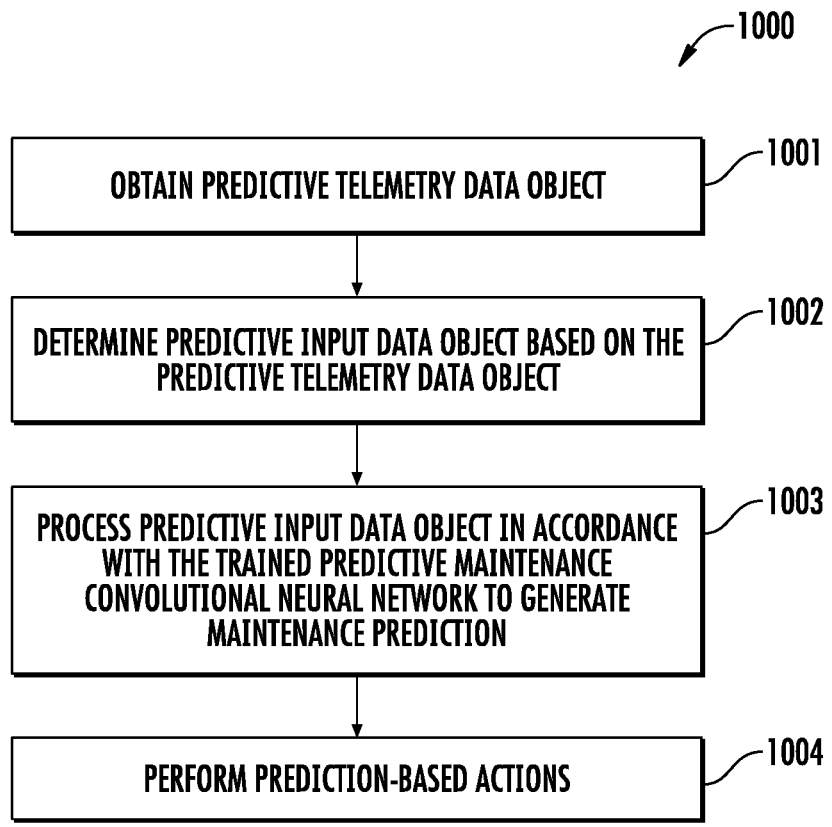

FIG. 10 is a flowchart diagram of an example process for performing a predictive inference using a trained predictive maintenance convolutional neural network in accordance with at least some embodiments disclosed herein.

Figure 11:
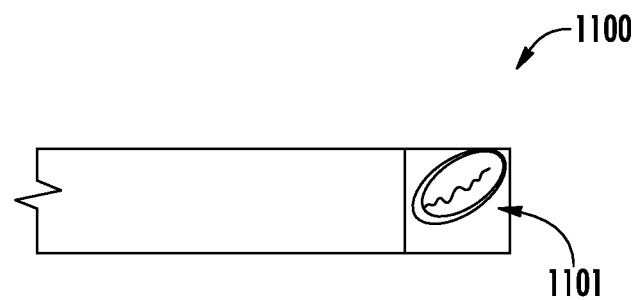

FIG. 11 provides an operational example of a per-input-object heatmap in accordance with at least some embodiments disclosed herein.

Figure 12:
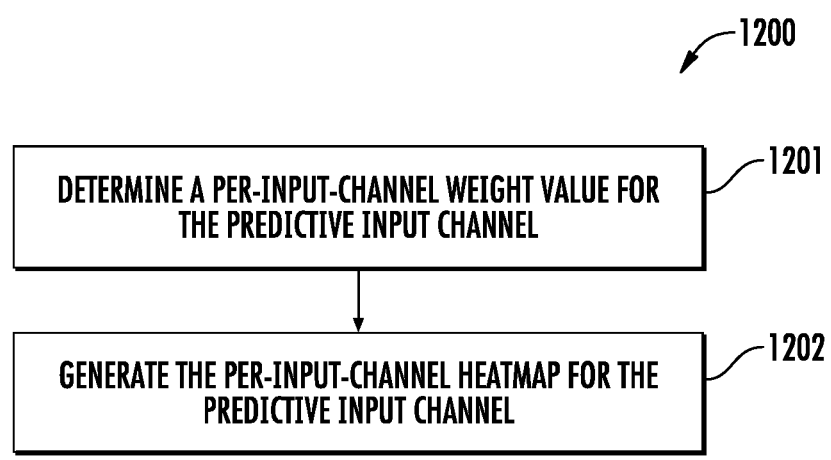

FIG. 12 is a flowchart diagram of an example process for generating a per-input-channel heatmap in accordance with at least some embodiments disclosed herein.

DETAILED DESCRIPTION OF VARIOUS EMBODIMENTS

Various embodiments disclosed herein now will be described more fully hereinafter with reference to the accompanying drawings, in which some, but not all embodiments of the disclosure are shown. Indeed, the disclosure can be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

Overview

Various embodiments of the present disclosure present techniques for training a convolutional neural network to generate maintenance predictions for a monitored system based on telemetry data associated with the monitored system as well as techniques for extracting explanatory metadata for maintenance-related predictive inferences based on outputs generated by the noted convolutional neural network. Through utilizing the noted techniques, various embodiments of the present disclosure enable performing automated predictive maintenance of monitored systems in an effective, efficient, and interpretable manner. The noted techniques also enable learning desired configurations of monitored systems (e.g., large-scale monitored systems with a large number of affected users) based on cross-temporal analyses of past malfunctioning history logs and/or past maintenance history logs associated with the noted large-scale monitored systems. In doing so, various embodiments of the present invention make substantial contributions to improving efficiency and effectiveness of monitoring and maintaining many kinds of physical systems, such as heating, ventilation, and air-conditioning systems.

Example System Architecture

Methods, apparatuses, and computer program products disclosed herein can be embodied by any of a variety of devices. For example, the method, apparatus, and computer program product of an example embodiment can be embodied by a networked device (e.g., an enterprise platform), such as a server or other network entity, configured to communicate with one or more devices, such as one or more query-initiating computing devices. Additionally or alternatively, the computing device can include fixed computing devices, such as a personal computer or a computer workstation. Still further, example embodiments can be embodied by any of a variety of mobile devices, such as a portable digital assistant (PDA), mobile telephone, smartphone, laptop computer, tablet computer, wearable, or any combination of the aforementioned devices.

Figure 1:
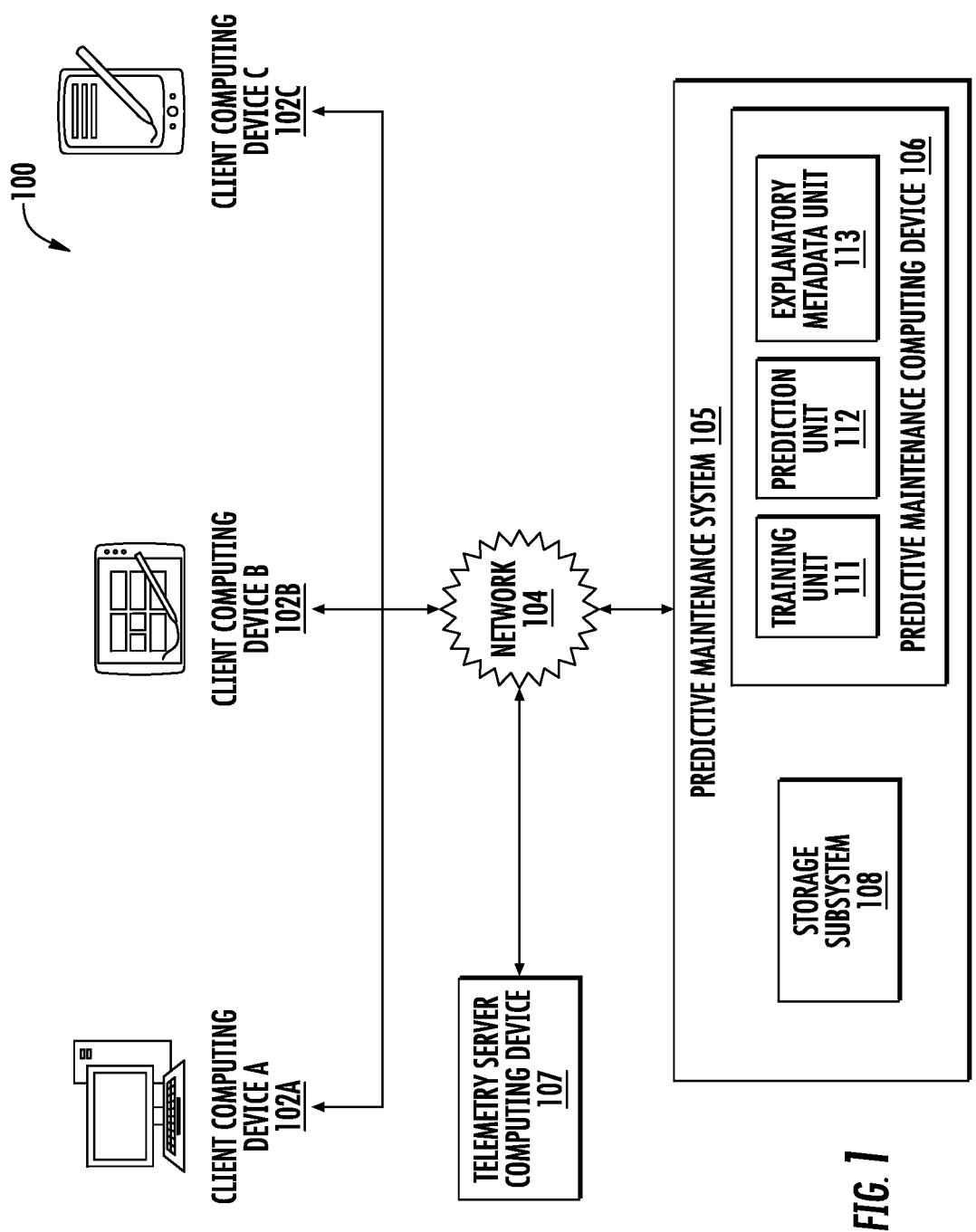
FIG. 1 is a block diagram of an example architecture within which at least some embodiments disclosed herein can operate.

FIG. 1 illustrates an example system architecture 100 within which embodiments disclosed herein can operate. The architecture 100 includes a predictive maintenance system 105 configured to interact with one or more client computing devices 102A-C, such as client computing device 102A, client computing device B 102B, and client computing device C 102C. The predictive maintenance system 105 can be configured to receive requests for performing predictive maintenance data analysis based on telemetry data from the client computing devices 102A-C, perform the predictive maintenance data analysis based on the telemetry to generate maintenance predictions, and provide the generated maintenance predictions to the client computing devices 102A-C.

The telemetry data is be associated with one or more monitored systems, such as one or more heating, ventilation, and air-conditioning systems. In some embodiments, telemetry data refers to data obtained by recording readings of one or more sensor devices configured to monitor one or more monitored systems (e.g., a heating, ventilation, and air-conditioning system). Examples of sensor devices whose readings are used to generate telemetry data include bag filter sensors, on-coil temperature sensors, supply air temperature sensors, environment humidity sensors, fan angular motion sensors, etc. In some embodiments, telemetry data refers to data generated based on one or more operational commands for a monitored system.

The predictive maintenance system 105 can communicate with the client computing devices 102A-C using a network 104. The network 104 can include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, the network 104 can include a cellular telephone, an 802.11, 802.16, 802.20, and/or WiMax network. Further, the network 104 can include a public network, such as the Internet, a private network, such as an intranet, or combinations thereof, and can utilize a variety of networking protocols now available or later developed including, but not limited to Transmission Control Protocol/Internet Protocol (TCP/IP) based networking protocols. For instance, the networking protocol can be customized to suit the needs of the group-based communication system. In some embodiments, the protocol is a custom protocol of JavaScript Object Notation (JSON) objects sent via a Websocket channel. In some embodiments, the protocol is JSON over RPC, JSON over REST/HTTP, and the like.

The predictive maintenance system 105 includes a predictive maintenance computing device 106 and a storage subsystem 108. The predictive maintenance computing device 106 can be configured to perform predictive maintenance based on telemetry data. The predictive maintenance computing device 106 includes a training unit 111, a prediction unit 112, and an explanatory metadata unit 113. The functions of the noted components 111-113 of the predictive maintenance computing device 106 are described below with reference to FIGS. 5-12.

The storage subsystem 108 is configured to store telemetry data as well as data associated with one or more predictive models utilized by the predictive maintenance computing device 106. The storage subsystem 108 can include one or more storage units, such as multiple distributed storage units that are connected through a computer network. Each storage unit in the storage subsystem 108 can store at least one of one or more data assets and/or one or more data about the computed properties of one or more data assets. Moreover, each storage unit in the storage subsystem 108 can include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

The predictive maintenance system 105 can receive the telemetry data from at least one of the client computing devices 102A-C as well as a telemetry server computing device 107. For example, a telemetry server computing device 107 can be a server device configured to monitor readings of one or more sensor devices associated with one or more monitored system. An example of a telemetry server computing device 107 is a server device associated with a heating, ventilation, and air-conditioning system. The telemetry data can be stored in the storage subsystem 108 of the predictive maintenance system 105. Examples of sensor devices whose readings recorded and transmitted by the telemetry server computing device 107 include bag filter sensors, on-coil temperature sensors, supply air temperature sensors, environment humidity sensors, fan angular motion sensors, etc. In some embodiments, the predictive maintenance system 105 generates the telemetry data based on telemetry signals received from the telemetry server computing device 107.

Exemplary Predictive Maintenance Computing Device

Figure 2:
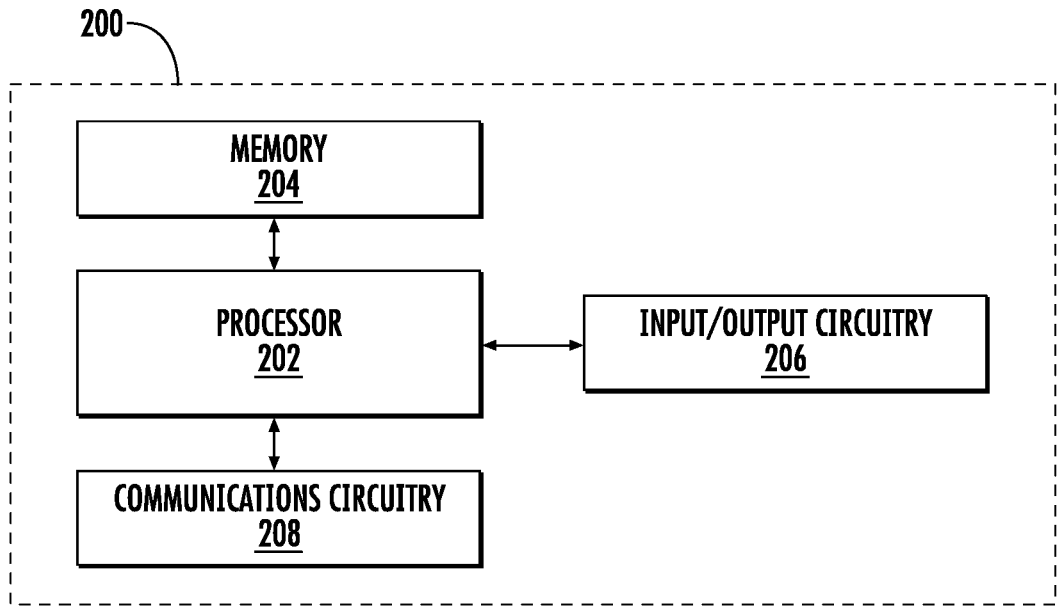
FIG. 2 is a block diagram of an example predictive maintenance computing device in accordance with at least some embodiments disclosed herein.

The predictive maintenance computing device 106 is embodied by one or more computing systems, such as apparatus 200 shown in FIG. 2. The apparatus 200 can include processor 202, memory 204, input/output circuitry 206, and communications circuitry 208. The apparatus 200 can be configured to execute the operations described herein. Although these components 202-208 are described with respect to functional limitations, it should be understood that the particular implementations necessarily include the use of particular hardware. It should also be understood that certain of these components 202-208 can include similar or common hardware. For example, two sets of circuitries can both leverage use of the same processor, network interface, storage medium, or the like to perform their associated functions, such that duplicate hardware is not required for each set of circuitries.

In some embodiments, the processor 202 (and/or co-processor or any other processing circuitry assisting or otherwise associated with the processor) can be in communication with the memory 204 via a bus for passing information among components of the apparatus. The memory 204 is non-transitory and can include, for example, one or more volatile and/or non-volatile memories. In other words, for example, the memory 204 can be an electronic storage device (e.g., a computer-readable storage medium). The memory 204 can be configured to store information, data, content, applications, instructions, or the like for enabling the apparatus to carry out various functions in accordance with example embodiments disclosed herein.

The processor 202 can be embodied in a number of different ways and can, for example, include one or more processing devices configured to perform independently. In some preferred and non-limiting embodiments, the processor 202 can include one or more processors configured in tandem via a bus to enable independent execution of instructions, pipelining, and/or multithreading. The use of the term "processing circuitry" can be understood to include a single core processor, a multi-core processor, multiple processors internal to the apparatus, and/or remote or "cloud" processors.

In some preferred and non-limiting embodiments, the processor 202 can be configured to execute instructions stored in the memory 204 or otherwise accessible to the processor 202. In some preferred and non-limiting embodiments, the processor 202 can be configured to execute hard-coded functionalities. As such, whether configured by hardware or software methods, or by a combination thereof, the processor 202 can represent an entity (e.g., physically embodied in circuitry) capable of performing operations according to an embodiment disclosed herein while configured accordingly. Alternatively, as another example, when the processor 202 is embodied as an executor of software instructions, the instructions can specifically configure the processor 202 to perform the algorithms and/or operations described herein when the instructions are executed.

In some embodiments, the apparatus 200 can include input/output circuitry 206 that can, in turn, be in communication with processor 202 to provide output to the user and, in some embodiments, to receive an indication of a user input. The input/output circuitry 206 can comprise a user interface and can include a display, and can comprise a web user interface, a mobile application, a query-initiating computing device, a kiosk, or the like. In some embodiments, the input/output circuitry 206 can also include a keyboard, a mouse, a joystick, a touch screen, touch areas, soft keys, a microphone, a speaker, or other input/output mechanisms. The processor and/or user interface circuitry comprising the processor can be configured to control one or more functions of one or more user interface elements through computer program instructions (e.g., software and/or firmware) stored on a memory accessible to the processor (e.g., memory 204, and/or the like).

The communications circuitry 208 can be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 can include, for example, a network interface for enabling communications with a wired or wireless communication network. For example, the communications circuitry 208 can include one or more network interface cards, antennae, buses, switches, routers, modems, and supporting hardware and/or software, or any other device suitable for enabling communications via a network. Additionally or alternatively, the communications circuitry 208 can include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 200. In some embodiments, one or more external systems (such as a remote cloud computing and/or data storage system) can also be leveraged to provide at least some of the functionality discussed herein.

Exemplary Client Computing Device

Figure 3:
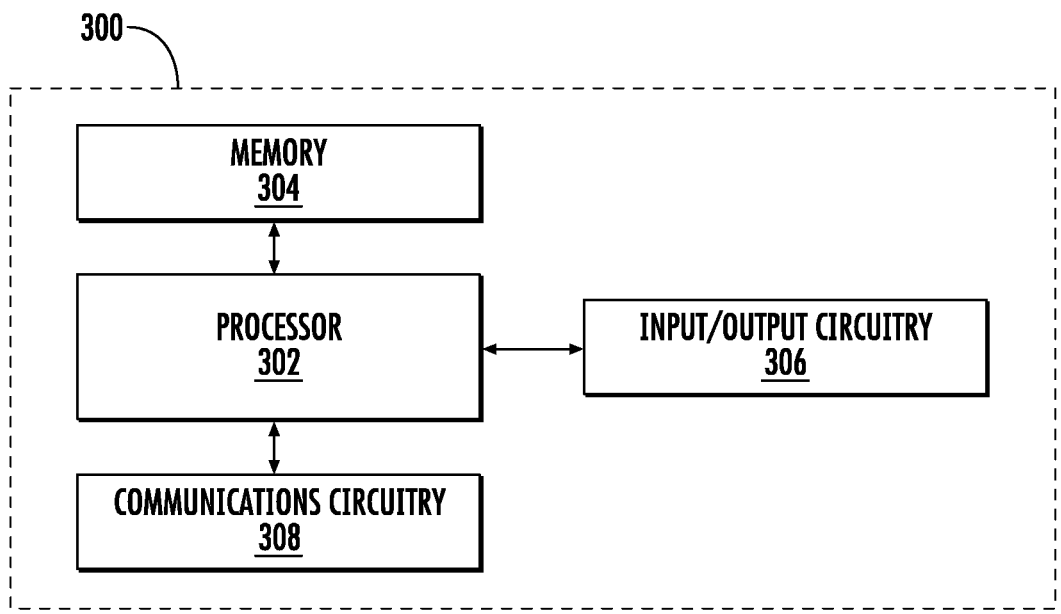
FIG. 3 is a block diagram of an example client computing device in accordance with at least some embodiments disclosed herein.

Referring now to FIG. 3, the client computing device 102A-C is embodied by one or more computing systems, such as apparatus 300 shown in FIG. 3. The apparatus 300 can include processor 302, memory 304, input/output circuitry 306, and communications circuitry 308. Although these components 302-308 are described with respect to functional limitations, it should be understood that the particular implementations necessarily include the use of particular hardware. It should also be understood that certain of these components 302-310 can include similar or common hardware. For example, two sets of circuitries can both leverage use of the same processor, network interface, storage medium, or the like to perform their associated functions, such that duplicate hardware is not required for each set of circuitries.

In some embodiments, the processor 302 (and/or co-processor or any other processing circuitry assisting or otherwise associated with the processor) can be in communication with the memory 304 via a bus for passing information among components of the apparatus. The memory 304 is non-transitory and can include, for example, one or more volatile and/or non-volatile memories. In other words, for example, the memory 304 can be an electronic storage device (e.g., a computer-readable storage medium). The memory 304 can include one or more databases. Furthermore, the memory 304 can be configured to store information, data, content, applications, instructions, or the like for enabling the apparatus 300 to carry out various functions in accordance with example embodiments disclosed herein.

The processor 302 can be embodied in a number of different ways and can, for example, include one or more processing devices configured to perform independently. In some preferred and non-limiting embodiments, the processor 302 can include one or more processors configured in tandem via a bus to enable independent execution of instructions, pipelining, and/or multithreading. The use of the term "processing circuitry" can be understood to include a single core processor, a multi-core processor, multiple processors internal to the apparatus, and/or remote or "cloud" processors.

In some preferred and non-limiting embodiments, the processor 302 can be configured to execute instructions stored in the memory 304 or otherwise accessible to the processor 302. In some preferred and non-limiting embodiments, the processor 302 can be configured to execute hard-coded functionalities. As such, whether configured by hardware or software methods, or by a combination thereof, the processor 302 can represent an entity (e.g., physically embodied in circuitry) capable of performing operations according to an embodiment disclosed herein while configured accordingly. Alternatively, as another example, when the processor 302 is embodied as an executor of software instructions (e.g., computer program instructions), the instructions can specifically configure the processor 302 to perform the algorithms and/or operations described herein when the instructions are executed.

In some embodiments, the apparatus 300 can include input/output circuitry 306 that can, in turn, be in communication with processor 302 to provide output to the user and, in some embodiments, to receive an indication of a user input. The input/output circuitry 306 can comprise a user interface and can include a display, and can comprise a web user interface, a mobile application, a query-initiating computing device, a kiosk, or the like. In some embodiments, the input/output circuitry 306 can also include a keyboard (e.g., also referred to herein as keypad), a mouse, a joystick, a touch screen, touch areas, soft keys, a microphone, a speaker, or other input/output mechanisms. The processor and/or user interface circuitry comprising the processor can be configured to control one or more functions of one or more user interface elements through computer program instructions (e.g., software and/or firmware) stored on a memory accessible to the processor (e.g., memory 304, and/or the like).

The communications circuitry 308 can be any means such as a device or circuitry embodied in either hardware or a combination of hardware and software that is configured to receive and/or transmit data from/to a network and/or any other device, circuitry, or module in communication with the apparatus 300. In this regard, the communications circuitry 308 can include, for example, a network interface for enabling communications with a wired or wireless communication network. For example, the communications circuitry 308 can include one or more network interface cards, antennae, buses, switches, routers, modems, and supporting hardware and/or software, or any other device suitable for enabling communications via a network. Additionally or alternatively, the communications circuitry 308 can include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 300. In some embodiments, one or more external systems (such as a remote cloud computing and/or data storage system) can also be leveraged to provide at least some of the functionality discussed herein.

Exemplary Telemetry Server Computing Device

Figure 4:
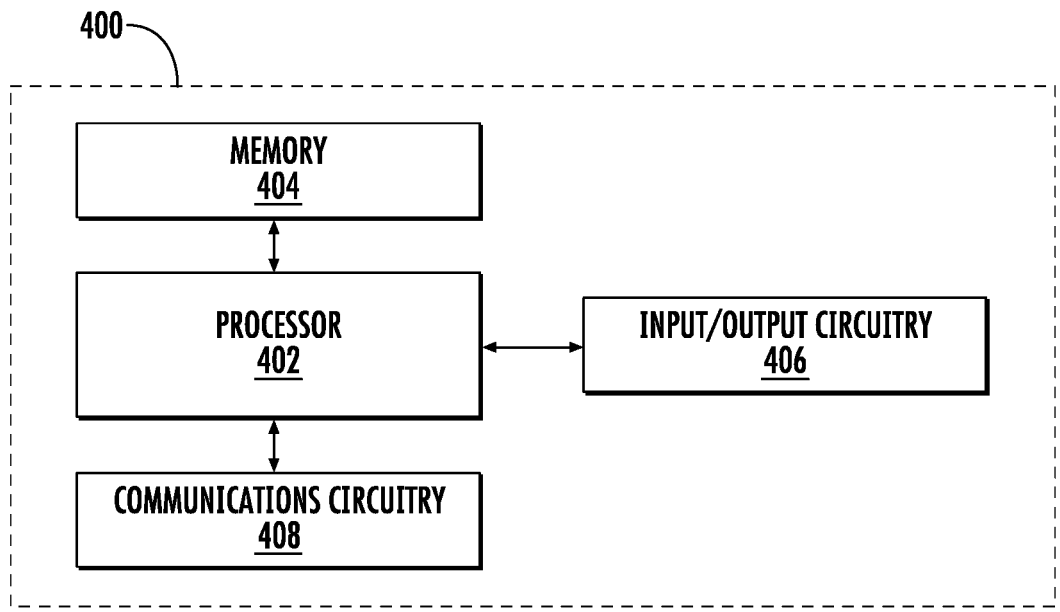
FIG. 4 is a block diagram of an example telemetry server computing device in accordance with at least some embodiments disclosed herein.

Referring now to FIG. 4, the telemetry server computing device 107 is embodied by one or more computing systems, such as apparatus 400 shown in FIG. 4. The apparatus 400 can include processor 402, memory 404, input/output circuitry 406, and communications circuitry 408. Although these components 402-408 are described with respect to functional limitations, it should be understood that the particular implementations necessarily include the use of particular hardware. It should also be understood that certain of these components 402-408 can include similar or common hardware. For example, two sets of circuitries can both leverage use of the same processor, network interface, storage medium, or the like to perform their associated functions, such that duplicate hardware is not required for each set of circuitries.

In some embodiments, the processor 402 (and/or co-processor or any other processing circuitry assisting or otherwise associated with the processor) can be in communication with the memory 404 via a bus for passing information among components of the apparatus. The memory 404 is non-transitory and can include, for example, one or more volatile and/or non-volatile memories. In other words, for example, the memory 404 can be an electronic storage device (e.g., a computer-readable storage medium). The memory 404 can include one or more databases. Furthermore, the memory 404 can be configured to store information, data, content, applications, instructions, or the like for enabling the apparatus 400 to carry out various functions in accordance with example embodiments disclosed herein.

The processor 402 can be embodied in a number of different ways and can, for example, include one or more processing devices configured to perform independently. In some preferred and non-limiting embodiments, the processor 402 can include one or more processors configured in tandem via a bus to enable independent execution of instructions, pipelining, and/or multithreading. The use of the term "processing circuitry" can be understood to include a single core processor, a multi-core processor, multiple processors internal to the apparatus, and/or remote or "cloud" processors.

In some preferred and non-limiting embodiments, the processor 402 can be configured to execute instructions stored in the memory 404 or otherwise accessible to the processor 402. In some preferred and non-limiting embodiments, the processor 402 can be configured to execute hard-coded functionalities. As such, whether configured by hardware or software methods, or by a combination thereof, the processor 402 can represent an entity (e.g., physically embodied in circuitry) capable of performing operations according to an embodiment disclosed herein while configured accordingly. Alternatively, as another example, when the processor 402 is embodied as an executor of software instructions (e.g., computer program instructions), the instructions can specifically configure the processor 402 to perform the algorithms and/or operations described herein when the instructions are executed.

In some embodiments, the apparatus 400 can include input/output circuitry 406 that can, in turn, be in communication with processor 402 to provide output to the user and, in some embodiments, to receive an indication of a user input. The input/output circuitry 406 can comprise a user interface and can include a display, and can comprise a web user interface, a mobile application, a query-initiating computing device, a kiosk, or the like. In some embodiments, the input/output circuitry 406 can also include a keyboard (e.g., also referred to herein as keypad), a mouse, a joystick, a touch screen, touch areas, soft keys, a microphone, a speaker, or other input/output mechanisms. The processor and/or user interface circuitry comprising the processor can be configured to control one or more functions of one or more user interface elements through computer program instructions (e.g., software and/or firmware) stored on a memory accessible to the processor (e.g., memory 404, and/or the like).

The communications circuitry 408 can be any means such as a device or circuitry embodied in either hardware or a combination of hardware and software that is configured to receive and/or transmit data from/to a network and/or any other device, circuitry, or module in communication with the apparatus 400. In this regard, the communications circuitry 408 can include, for example, a network interface for enabling communications with a wired or wireless communication network. For example, the communications circuitry 408 can include one or more network interface cards, antennae, buses, switches, routers, modems, and supporting hardware and/or software, or any other device suitable for enabling communications via a network. Additionally or alternatively, the communications circuitry 408 can include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 400. In some embodiments, one or more external systems (such as a remote cloud computing and/or data storage system) can also be leveraged to provide at least some of the functionality discussed herein.

Example Data Flows and Operations

Various embodiments of the present disclosure present techniques for training a convolutional neural network to generate maintenance predictions for a monitored system based on telemetry data associated with the monitored system as well as techniques for extracting explanatory metadata for maintenance-related predictive inferences based on outputs generated by the noted convolutional neural network. Through utilizing the noted techniques, various embodiments of the present disclosure enable performing automated predictive maintenance of monitored systems in an effective, efficient, and interpretable manner. The noted techniques also enable learning desired configurations of monitored systems (e.g., large-scale monitored systems with a large number of affected users) based on cross-temporal analyses of past malfunctioning history logs and/or past maintenance history logs associated with the noted large-scale monitored systems. In doing so, various embodiments of the present invention make substantial contributions to improving efficiency and effectiveness of monitoring and maintaining many kinds of physical systems, such as heating, ventilation, and air-conditioning systems.

Training Predictive Maintenance Convolutional Neural Networks

Figure 5:
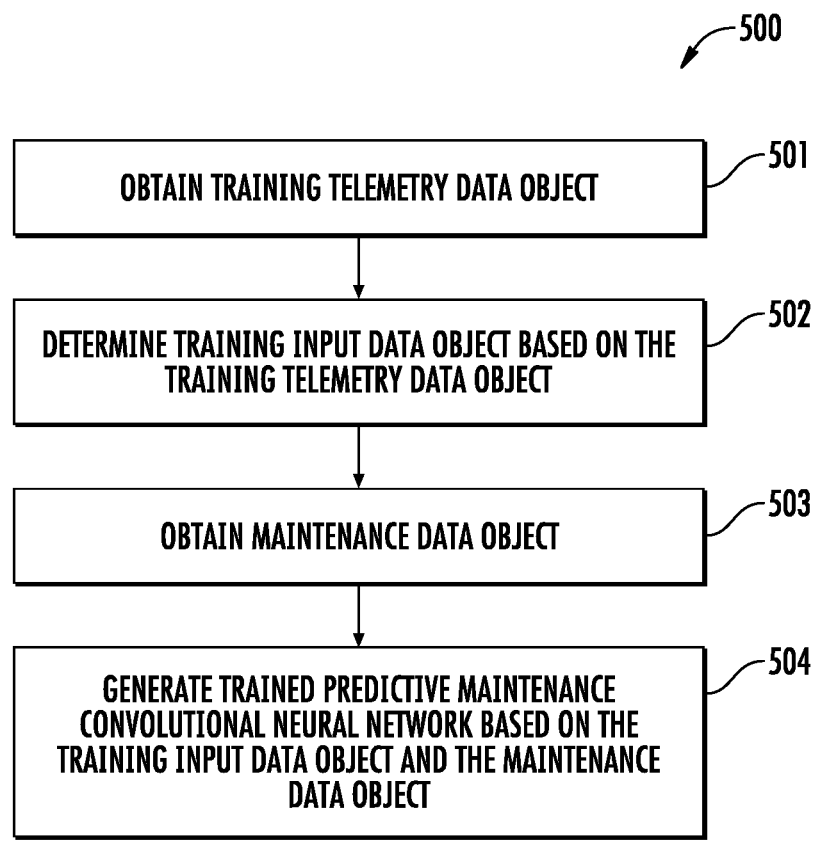
FIG. 5 is a flowchart diagram of an example process for training a predictive maintenance convolutional neural network in accordance with at least some embodiments disclosed herein.

FIG. 5 is a flowchart diagram of an example process 500 for training a predictive maintenance convolutional neural network. Via the various steps of the process 500, a training unit 111 of the predictive maintenance computing device 106 can efficiently and effectively train a predictive maintenance convolutional neural network that is configured to perform efficient, effective, and interpretable predictive inferences related to maintenance needs of a monitored system, e.g., a monitored heating, ventilation, air-conditioning system.

As used herein, a convolutional neural network is any machine learning model that processes its input data in accordance with one or more convolutional layers each followed (immediately or after one or more intervening layers) by a pooling layer, where the final output of the convolutional layers and the pooling layers can then be supplied to one or more discriminant layers, such as one or more fully-connected discriminant layers. A predictive maintenance convolutional neural network is a convolutional neural network used for performing predictive maintenance of a monitored system based on telemetry data associated with the monitored system. While various embodiments of the present disclosure describe performing predictive maintenance with respect to a single monitored system, a person of ordinary skill in the relevant technology will recognize that the disclosed techniques can be used to perform predictive maintenance of any number of monitored systems.

The process 500 begins at step 501 when the training unit 111 obtains a training telemetry data object for the monitored system. As used herein, a telemetry data object is a data object that includes measurements of a group of one or more sensor devices across a group of one or more time units. Accordingly, a telemetry data object includes a plurality of per-time-unit-per-sensor measurements, where each per-time-unit-per-sensor measurement of the plurality of per-time-unit-per-sensor measurements is associated with a time unit of one or more time units and a sensor device of one or more sensor devices. A training telemetry data object is a data object used for training a predictive maintenance convolutional neural network. Accordingly, a training telemetry data object includes a plurality of per-time-unit-per-sensor training measurements, where each per-time-unit-per-sensor training measurement of the plurality of per-time-unit-per-sensor training measurements is associated with a training time unit of one or more training time units and a sensor device of one or more sensor devices. In some embodiments, telemetry data includes data determined based on measurements from one or more sensor devices.

An operational example of telemetry data object 600 is presented in FIG. 6. As depicted in FIG. 6, the telemetry data object 600 includes a timeseries graph whose values depict differential pressure measurements of three sensor devices 601 during the temporal units defined by the x-axis of the timeseries graph. As further depicted in FIG. 6, the telemetry data object 600 includes various per-time-unit-per-sensor measurements, where each per-time-unit-per-sensor measurement is associated with a training time unit of the one or more training time units defined by the x-axis of the timeseries graph and a sensor device of the three sensor devices 601. For example, the per-time-unit-per-sensor measurement 621 is associated with a bag filter sensor device and a time unit 602. As another example, the per-time-unit-per-sensor measurement 622 is associated with a bag filter sensor device and a time unit 602. As yet another example, the per-time-unit-per-sensor measurement 623 is associated with an on-coil temperature sensor device and a time unit 602.

Returning to FIG. 5, at operation 502, the training unit 111 determines a training input data object based on the training telemetry data object. As used herein, an input data object is a data object configured to be supplied to a predictive maintenance convolutional neural network. The input data object has a data format defined by an input structure of the predictive maintenance convolutional neural network. In some embodiments, the data format of the input data object is among the data formats known in the relevant technical field to be conducive to the capabilities and structures of convolutional-neural-network-based machine learning models. For example, the input data object can have an image format, an audio format, etc. A training input data object is an input data object used for training a predictive maintenance convolutional neural network.

The input data object has one or more input channels, where each input channel is associated with a respective sensor device and is determined based on a subset of the per-time-unit-per-sensor measurements of the telemetry data object that is associated with the respective sensor device. In some embodiments, if the input data object is a visual data object (e.g., an image data object), the one or more input channels of the input data object are defined based on one or more color-based channels of the image data object, where the one or more color-based channels are defined by a color encoding scheme of the image data object.

For example, if the image data object has a grayscale color encoding scheme, the input channels of the image data object include a first input channel corresponding to a black color-based channel as well as a second input channel corresponding to a white color-based channel. As another example, if the image data object has a red-green-blue (RGB) color encoding scheme, the input channels of the image data object include a first input channel corresponding to a red color-based channel, a second input channel corresponding to a green color-based channel, and a third input channel corresponding to a blue color-based channel.

As noted above, a training input data object is an input data object used for training a predictive maintenance convolutional neural network. Accordingly, the training input data object is associated with one or more training input channels, where training input channel of the one or more training input channels is associated with a sensor device of the one or more sensor devices associated with the training telemetry data object, and where each training input channel is determined based on a subset of the per-time-unit-per-sensor training measurements of the training telemetry data object that is associated with the respective sensor device.

While various embodiments of the present disclosure describe input channels that each are associated with a single sensor device and are determined based on telemetry data associated with a single sensor device, a person of ordinary skill in the relevant technology will recognize that each input channel can be associated with any number of sensor devices and be determined based on telemetry data associated with any number of sensor devices. Furthermore, while various embodiments of the disclosure describe input channels of an image-based input data object, a person of ordinary skill in the relevant technology will recognize that input channels can be created in data objects having any data format. Moreover, while various embodiments of the present disclosure describe color-based input channels for image-based input data objects, a person of ordinary skill in the relevant technology will recognize that image-based data objects can include non-color-based input channels, such as feature-based input channels, where each feature-based input channel can itself be an image, and where the image-based input data object is generated by superimposing the feature-based input channels on one another to generate the image-based input data object.

An operational example of an input data object 700 is presented in FIG. 7. As depicted in FIG. 7, the input data object 700 includes three input channels 701-703, where each input channel of the three input channels 701-703 is associated with a sensor device of the three sensor devices 601 depicted in the telemetry data object 600 of FIG. 6. In particular, the input channel 701 is associated with a bag filter sensor device and is determined based on a subset of the per-time-unit-per-sensor measurements of the telemetry data object 600 that is associated with the noted bag filter sensor device; the input channel 702 is associated with an on-coil temperature sensor device and is determined based on a subset of the per-time-unit-per-sensor measurements of the telemetry data object 600 that is associated with the noted bag filter sensor device; and the input channel 703 is associated with a supply air temperature sensor device and is determined based on a subset of the per-time-unit-per-sensor measurements of the telemetry data object 600 that is associated with the noted bag filter sensor device.

Returning to FIG. 5, at operation 503, the training unit 111 obtains a maintenance input data object. As used herein, a maintenance input data object is a data object that identifies one or more time units (e.g., one or more time units of the training time units associated with the training telemetry data object) as maintenance-critical time units. In some embodiments, in addition to identifying maintenance-critical time units, the maintenance input data object provide one or more maintenance time unit features of each maintenance-critical time unit, such as a source and/or an urgency level of maintenance need identifier associated with each maintenance-critical time unit, an affected tenant identifier associated with each maintenance-critical time unit, etc. A maintenance data object can be used to train one or more predictive maintenance convolutional neural networks and/or to perform a convolutional-neural-network-based predictive maintenance operation using a trained predictive maintenance convolutional neural network. The contents of a maintenance data object are generated using the maintenance data associated with the monitored system and in accordance with a structure of maintenance predictions generated by predictive maintenance convolutional neural networks being trained using the maintenance data object.

For example, to train a predictive maintenance convolutional neural network that is configured to generate maintenance predictions that denote predicted maintenance needs of any urgency level with respect to a single monitored system (e.g., the heating, ventilation, and air-conditioning system of a particular building), the training unit 111 can generate a maintenance data object that identifies all timestamps of maintenance logs associated with the single monitored system as maintenance-critical time units. As another example, to train a predictive maintenance convolutional neural network that is configured to generate maintenance predictions that denote predicted maintenance needs of any urgency level with respect to multiple monitored systems, the training unit 111 can generate a maintenance data object that identifies all timestamps of maintenance logs associated with any one or more of the monitored systems as maintenance-critical time units. As yet another example, to train a predictive maintenance convolutional neural network that is configured to generate maintenance predictions that denote predicted maintenance needs of a particular urgency level and/or a particular source with respect to a single monitored system, the training unit 111 can generate a maintenance data object that identifies all timestamps of maintenance logs having the particular urgency level and/or the particular source that are associated with the single monitored system. As a further example, to generate a maintenance data object that identifies all timestamps of maintenance logs having any of multiple particular urgency levels and/or multiple particular sources with respect to a single monitored system, the training unit 111 can generate a maintenance data object that identifies all timestamps of maintenance logs having at least one of the multiple particulars urgency levels and/or at least one of the multiple particular sources that are associated with the single monitored system. As a further example, to generate a maintenance data object that identifies all timestamps of maintenance logs satisfying particular criteria along with a predicted feature (e.g., source, urgency level, etc.) of each maintenance log for an identified timestamp, the training unit 111 can generate a maintenance data object that identifies all timestamps of maintenance logs satisfying particular criteria along with the noted predicted feature of each maintenance log for an identified timestamp.

An operational example of a maintenance data object 800 is presented in FIG. 8. As depicted in FIG. 8, the maintenance data object 800 includes one or more entries each identifying a maintenance-critical time unit. For example, entry 801 of the maintenance data object 800 identifies 18:08 of Oct. 3, 2016 as a maintenance critical time unit. As another example, entry 802 of the maintenance data object 800 identifies 16:43 of Jan. 1, 2017 as a maintenance critical time unit. As yet another example, entry 803 of the maintenance data object 800 identifies 16:53 Jan. 1, 2017 as a maintenance critical time unit. As a further example, entry 804 of the maintenance data object 800 identifies 17:00 Jun. 14, 2017 as a maintenance critical time unit.

Returning to FIG. 5, at operation 504, the training unit 111 generates a trained predictive maintenance convolutional neural network based on the training input data object and the maintenance data object. In some embodiments, to generate the trained predictive maintenance convolutional neural network, the training unit 111 utilizes one or more training algorithms, such as an optimization-based training algorithm. An example of an optimization-based training algorithm that is suitable for generating the trained predictive maintenance convolutional neural network is gradient descent with backpropagation.

For example, in some embodiments, to generate the trained predictive maintenance convolutional neural network, the training unit 111 provides the training input data object to an untrained predictive maintenance convolutional neural network. The training unit 111 then processes the training input data object in accordance with an untrained predictive maintenance convolutional neural network to generate an inferred maintenance prediction for the untrained predictive maintenance convolutional neural network. The training unit 111 then generates a measure of error for the untrained predictive maintenance convolutional neural network based on a deviation between the inferred maintenance predictions and the maintenance data indicated by the maintenance data object. The training unit 111 then determines a gradient of the measure of error with respect to parameters of the untrained predictive maintenance convolutional neural network. The training unit 111 then backpropagates the measure of error to update the parameters of the untrained predictive maintenance convolutional neural network to minimize measure of error. While various embodiments of the present disclosure disclose training algorithms that seek to minimize error functions, a person of ordinary skill in the relevant technology will recognize that an optimization-based training algorithm can seek to maximize a utility function instead of minimizing a cost function.

An operational example of a predictive maintenance convolutional neural network 900 is depicted in FIG. 9. As depicted in FIG. 9, the predictive maintenance convolutional neural network 900 includes a group of feature extraction layers 901 configured to obtain an input data object 931 having one or more input channels, process the input data object 931 to generate a feature map 932 for each input channel of the one or more input channels, and provide the feature maps 932 to a group of fully-connected layers 902 of the predictive maintenance convolutional neural network 900. As further depicted in FIG. 9, the group of feature extraction layers 901 includes one or more sequentially-ordered sub-groups, where each sequentially-ordered sub-group includes a convolutional layer (e.g., a one-dimensional convolutional layer), followed by a batch normalization layer, followed by an activation layer (e.g., an activation layer utilizing a rectified linear unit activation function), followed by a pooling layer. As further depicted in FIG. 9, the predictive maintenance convolutional neural network 900 includes the group of fully-connected layers 902 configured to receive the feature maps 932 from the group of feature extraction layers 901 and process the feature maps 932 to generate a maintenance prediction 933. While various embodiments of the present disclosure describe convolutional neural networks having fully-connected discriminant layers, a person of ordinary in the relevant technology will recognize that other types of machine learning models can be used as discriminant layers of a convolutional neural networks.

Performing Predictive Inferences Using Trained Predictive Maintenance Convolutional Neural Networks Once trained, a predictive maintenance convolutional neural network can be used to perform predictive inferences using telemetry data associated with monitored systems to generate maintenance predictions for the noted monitored systems. A maintenance prediction is any prediction about anticipated maintenance needs of a monitored system. For example, a maintenance prediction can be a prediction about whether a monitored system will have a maintenance need in the near future and/or within a particular timeframe. As another example, a maintenance prediction can be a prediction about whether a monitored system will have a maintenance need of a particular type and/or a particular urgency level in the near future and/or within a particular timeframe. As yet another example, a maintenance prediction can be a prediction about a predicted type and/or a predicted urgency level of an existing maintenance need. As a further example, a maintenance prediction may describe one or more affected hardware units of the hardware units associated with a monitored system, where the one or more affected hardware units are determined based on processing predictive telemetry data using a trained predictive maintenance convolutional neural network FIG. 10 is a flowchart diagram of an example process 1000 for performing predictive inferences using trained predictive maintenance convolutional neural networks. Via the various operations of process 1000, a prediction unit 112 of the predictive maintenance computing device 106 can efficiently and effectively perform efficient, effective, and interpretable predictive inferences related to maintenance needs of a monitored system, e.g., a monitored heating, ventilation, air-conditioning system. While various embodiments of the present disclosure describe the training and predictive inference processes as performed by different units of a single computing device, a person of ordinary skill in the relevant technology will recognize that the noted processes can each be performed by a separate computing device of a group of computing devices that are connected to each other via a network and/or can be configured to operate in a distributed manner.

The process 1000 begins at operation 1001 when the prediction unit 112 obtains a predictive telemetry data object. A predictive telemetry data object is a telemetry data object (e.g., a telemetry data object having a structure similar to the structure depicted in FIG. 6) that is used for performing a predictive inference that utilizes a trained predictive maintenance convolutional neural network. Accordingly, the predictive telemetry data object is associated with a plurality of per-time-unit-per-sensor predictive measurements, where each per-time-unit-per-sensor predictive measurement of the plurality of per-time-unit-per-sensor predictive measurements is associated with a sensor device of the one or more sensor devices and a predictive time unit of one or more predictive time units. In some embodiments, the prediction unit 112 obtains at least a portion of the predictive telemetry data object from a client computing device 102A-C.

At operation 1002, the prediction unit 112 determines a predictive input data object based on the predictive telemetry data object. A predictive input data object is an input data object (e.g., an input data object having a structure similar to the structure depicted in FIG. 7) that is supplied to a trained predictive maintenance convolutional neural network to perform predictive inference using the trained predictive maintenance convolutional neural network. Accordingly, the predictive input data object includes one or more predictive input channels, where each predictive input channel of the one or more predictive input channels is associated with a sensor device of the one or more sensor devices whose measurements are captured by the predictive telemetry data object, and further where predictive input channel of the one or more predictive input channels is determined based on a second subset of the plurality of per-time-unit-per-sensor predictive measurements in the predictive telemetry data object that is associated with the sensor device for the predictive input channel.

At operation 1003, the prediction unit 112 processes the predictive input data object in accordance with the trained predictive maintenance convolutional neural network (e.g., a trained predictive maintenance convolutional neural network having the architecture depicted in FIG. 9) to generate the maintenance prediction for the monitored system. In some embodiments, the prediction unit 112 adopts the output of the final discriminant layer of trained predictive maintenance convolutional neural network as the maintenance prediction. In some embodiments, the prediction unit 112 performs one or more operations (e.g., one or more softmax normalization operations) on the output of the final discriminant layer of trained predictive maintenance convolutional neural network to generate normalized output values, where the normalized output values can then be used to generate the maintenance prediction.

At operation 1004, the prediction unit 112 performs one or more prediction-based actions based on the generated maintenance prediction. Examples of prediction-based actions include setting configuration parameters of the monitored system to accommodate the maintenance needs indicated by the maintenance prediction, generating one or more maintenance need notifications, adjusting performance of one or more sensor devices based on the maintenance prediction to accommodate the maintenance needs indicated by the maintenance prediction, automatically scheduling one or more maintenance appointments to address the maintenance needs indicated by the maintenance prediction, etc.

Generating Explanatory Metadata for Predictive Inferences Performed Using Trained Predictive Maintenance Convolutional Neural Networks By utilizing per-sensor feature maps that can be generated by a trained predictive maintenance convolutional neural network, various embodiments of the present disclosure can efficiently and effectively generate per-input-channel heatmaps that each highlights particular portions of a corresponding input channel as having a relatively higher degree of predictive significance for a particular predictive relevance compared to other portions of the corresponding input channel. An operational example of such a per-input-channel heatmap 1100 is provided in FIG. 11. As depicted in FIG. 11, the per-input-channel heatmap 1100 indicates a portion 1101 of the input channel 701 of FIG. 7 as having greater predictive significance for a particular predictive relevance.

According to various embodiments of the present disclosure, because each input channel can be associated with one or more corresponding sensor devices (e.g., a single corresponding sensor device), explanatory metadata can be generated on a per-sensor level and/or a per-sensor-group level. This is an important distinction between various embodiments of the present disclosure and many existing techniques for generating metadata that generate explanatory metadata on a cross-input-channel level. By generating per-input-channel explanatory metadata, various embodiments of the present disclosure can present highly granular explanatory metadata about associations of sensor measurements and generated maintenance predictions.

FIG. 12 is a flowchart diagram of an example process 1200 for generating a per-input-channel heatmap for a predictive input channel of a predictive input data object. Via the various operations of the process 1200, an explanatory metadata unit 113 of the predictive maintenance computing device 106 can efficiently and effectively generate metadata correlating granular sensor measurements with maintenance predictions, thus making predictive inferences performed using trained predictive inference convolutional neural networks more interpretable. While various embodiments of the present disclosure describe the training process, the predictive inference process, and the explanatory metadata generation process as performed by different units of a single computing device, a person of ordinary skill in the relevant technology will recognize that the noted processes can be performed by any number of computing device that can be connected to each other via a network and/or can be configured to operate in a distributed manner.

The process 1200 begins at operation 1201 when the explanatory metadata unit 113 determines a per-input-channel weight value for the predictive input channel with respect to a target classification category associated with a maintenance prediction. In some embodiments, the target classification category is a candidate classification category for a maintenance state of the monitored system that can be indicated by the maintenance prediction. For example, if a trained predictive maintenance convolutional neural network is configured to generate maintenance predictions that describe whether a monitored system is predicted to have maintenance needs within a timeframe, the target classification category for the maintenance predictions can be a candidate classification category indicating an affirmative prediction of a maintenance needs within the noted timeframe or a candidate classification category indicating a negative prediction of a maintenance needs within the noted timeframe.

In some embodiments, to determine the per-input-channel weight value for the predictive input channel with respect to the target classification category, the explanatory metadata unit 113 first determines a gradient of a target classification category score associated with the target classification category with respect to the feature map for the predictive input category and then determines the per-input-channel weight value for the predictive input channel with respect to the target classification category based on the noted determined gradient of the target classification category score associated with the target classification category with respect to the feature map for the predictive input category.

In some embodiments, to determine the per-input-channel weight value based on the determined gradient of the target classification category score with respect to the feature map, the explanatory metadata unit 113 applies a global-max-pooling and/or global-average-pooling operation to the determined gradient to determine the per-input-channel-weight value. In some embodiments, to determine the per-input-channel weight value for the predictive input channel with respect to the target classification category, the explanatory metadata unit 113 utilizes the operations described by Selvaraju et al., *Grad-CAM: Visual Explanations from Deep Networks via Gradient-Based Localization* at Equation 1 on p. 4 and accompanying description, arXiv:1610.02391 [cs.CV] (2016), available online at https://arxiv.org/pdf/1610.02391.pdf (hereinafter Selvaraju).

At operation 1202, the explanatory metadata unit 113 generates a per-input-channel heatmap for the predictive input channel based on the per-input-channel weight value for the sensor device and a feature map for the predictive input channel generated by the trained predictive maintenance convolutional neural network The per-input-channel for the predictive input channel indicates a per-component predictive significance value for each component (e.g., each pixel, each audio second, each image portion, etc.) of a plurality of components of the predictive input channel, where the per-component predictive significance value indicates a relative predictive relevance of a corresponding component to generating a particular maintenance prediction. In some embodiments, generating the per-input-channel heatmap for the predictive input channel comprises performing guided backpropagation, e.g., according to some aspects of the techniques disclosed by Selvaraju.

In some embodiments, generating the per-input-channel heatmap for the predictive input channel comprises determining a per-input-channel activation output based the per-input-channel weight value for the predictive input channel and the feature map the predictive input channel; and applying an activation function (e.g., a rectified linear unit activation function) to the per-input-channel activation output to generate the per-input-channel heatmap for the predictive input channel. In some embodiments, generating the per-sensor heatmap for the predictive input channel comprises performing operations described by the below equation:

$$L_k = \text{ReLu}(a_k * A_k) \qquad \text{Equation 1}$$

In the above Equation 1, $L_k$ is the per-input-channel heatmap for the kth predictive input channel (and/or for the sensor device associated with the kth predictive input channel), ReLu is a rectified linear unit function, $a_k$ is the per-input-channel weight value for the kth predictive input channel, and $A_k$ is the feature map for the kth predictive input channel.

Additional Implementation Details

Although example processing systems have been described in the figures herein, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer-readable storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer-readable storage medium can be, or be included in, a computer-readable storage device, a computer-readable storage substrate, a random or serial access memory array or device, or a combination of one or more of them. Moreover, while a computer-readable storage medium is not a propagated signal, a computer-readable storage medium can be a source or destination of computer program instructions encoded in an artificially-generated propagated signal. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (Application Specific Integrated Circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program can, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's query-initiating computing device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a query-initiating computing device having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., a Hypertext Markup Language (HTML) page) to a query-initiating computing device (e.g., for purposes of displaying information/data to and receiving user input from a user interacting with the query-initiating computing device). Information/data generated at the query-initiating computing device (e.g., a result of the user interaction) can be received from the query-initiating computing device at the server.

While this specification contains many specific implementation details, these should not be construed as limitations on the scope of any inventions or of what can be claimed, but rather as description of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

Similarly, while operations are depicted in the drawings in a particular order, this should not be understood as requiring that such operations be performed in the particular order shown or in incremental order, or that all illustrated operations be performed, to achieve desirable results, unless described otherwise. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or incremental order, to achieve desirable results, unless described otherwise. In certain implementations, multitasking and parallel processing can be advantageous.

Conclusion

Many modifications and other embodiments of the inventions set forth herein will come to mind to one skilled in the art to which these inventions pertain having the benefit of the teachings presented in the foregoing description and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

The invention claimed is:

1. A computer-implemented method for performing predictive maintenance of a monitored system, the computer-implemented method comprising:
   obtaining, a training telemetry data object corresponding to telemetry data indicative of time-series sensor measurement data collected from a plurality of sensors of the monitored system;
   determining, based on the training telemetry data object, a training input data object which is in a data format defined by an input structure of a predictive maintenance convolutional neural network, wherein the training input data object comprises one or more training input channels which are based on a type of the training input data object, and wherein each training input channel is associated with a sensor from amongst the plurality of sensors and based on a subset of the telemetry data;
   obtaining a maintenance data object for the monitored system, wherein the maintenance data object identifies one or more maintenance-critical timestamp of the time-series sensor measurement data; and
   generating, based on the training input data object and the maintenance data object, a trained predictive maintenance convolutional neural network, wherein the trained predictive maintenance convolutional neural network is configured to process a predictive input data object for the monitored system to generate a maintenance prediction for the monitored system.

2. The computer-implemented method of claim 1, further comprising:
   obtaining a predictive telemetry data object corresponding to predictive telemetry data indicative of predictive time-series sensor measurement data for the monitored system;
   determining, based on the predictive telemetry data object, a predictive input data object, wherein the predictive input data object comprises one or more predictive input channels, and wherein each predictive input channel of the one or more predictive input channels is associated with the sensor of the plurality of sensors, and further wherein each predictive input channel of the one or more predictive input channels is determined based on a first-subset of the predictive time-series sensor measurement data that is associated with the sensor for the predictive input channel; and
   processing the predictive input data object in accordance with the trained predictive maintenance convolutional neural network to generate the maintenance prediction for the monitored system, and wherein the monitored system is a heating, ventilation, and air-conditioning system, and wherein the trained predictive maintenance convolutional neural network is generated using a gradient descent training routine.

3. The computer-implemented method of claim 2, further comprising:
   for each predictive input channel of the one or more predictive input channels,
      determining a per-input-channel weight value for the predictive input channel with respect to a target classification category associated with the maintenance prediction; and
      generating a per-input-channel heatmap for the predictive input channel based on the per-input-channel weight value for the predictive input channel and a feature map for the predictive input channel, wherein the per-input-channel heatmap for the predictive input channel indicates a per-component predictive significance value for each component of a plurality of components of the predictive input channel.

4. The computer-implemented method of claim 3, wherein generating the per-input-channel heatmap for the predictive input channel comprises:
   determining a per-input-channel activation output based the per-input-channel weight value for the predictive input channel and the feature map the predictive input channel; and
   applying an activation function to the per-input-channel activation output to generate the per-input-channel heatmap for the predictive input channel, and wherein the activation function is a rectified linear unit activation function.

5. The computer-implemented method of claim 3, wherein generating the per-input-channel heatmap for the predictive input channel comprises performing guided back-propagation.

6. An apparatus for performing predictive maintenance of a monitored system, the apparatus comprising at least one processor and at least one memory including program code, the at least one memory and the program code configured to, with the processor, cause the apparatus to at least:
   obtain a training telemetry data object corresponding to telemetry data indicative of time-series sensor measurement data collected from a plurality of sensors of the monitored system;
   determine, based on the training telemetry data object, a training input data object which is in a data format defined by an input structure of a predictive maintenance convolutional neural network, wherein the training input data object comprises one or more training input channels which are based on a type of the training input data object, and wherein each training input channel is associated with a sensor from amongst the plurality of sensors and based on a subset of the telemetry data;

obtain a maintenance data object for the monitored system, wherein the maintenance data object identifies one or more maintenance-critical timestamp of the time-series sensor measurement data; and generate, based on the training input data object and the maintenance data object, a trained predictive maintenance convolutional neural network, wherein the trained predictive maintenance convolutional neural network is configured to process a predictive input data object for the monitored system to generate a maintenance prediction for the monitored system.

7. The apparatus of claim 6, wherein the program code is further configured to, with the processor, cause the apparatus to at least:

obtain a predictive telemetry data object corresponding to predictive telemetry data indicative of predictive time-series sensor measurement data for the monitored system;

determine, based on the predictive telemetry data object, a predictive input data object, wherein the predictive input data object comprises one or more predictive input channels, and wherein each predictive input channel of the one or more predictive input channels is associated with the sensor of the plurality of sensors, and further wherein each predictive input channel of the one or more predictive input channels is determined based on a first subset of the predictive time-series sensor measurement data that is associated with the sensor for the predictive input channel; and process the predictive input data object in accordance with the trained predictive maintenance convolutional neural network to generate the maintenance prediction for the monitored system.

8. The apparatus of claim 7, wherein the program code is further configured to, with the processor, cause the apparatus to at least:

for each predictive input channel of the one or more predictive input channels,
determine a per-input-channel weight value for the predictive input channel with respect to a target classification category associated with the maintenance prediction; and
generate a per-input-channel heatmap for the predictive input channel based on the per-input-channel weight value for the predictive input channel and a feature map for the predictive input channel, wherein the per-input-channel heatmap for the predictive input channel indicates a per-component predictive significance value for each component of a plurality of components of the predictive input channel.

9. The apparatus of claim 8, wherein generating the per-input-channel heatmap for the predictive input channel comprises:

determining a per-input-channel activation output based the per-input-channel weight value for the predictive input channel and the feature map the predictive input channel; and applying an activation function to the per-input-channel activation output to generate the per-input-channel heatmap for the predictive input channel.

10. The apparatus of claim 8, wherein generating the per-input-channel heatmap for the predictive input channel comprises performing guided backpropagation.

11. The apparatus of claim 6, wherein the monitored system is a heating, ventilation, and air-conditioning system.

12. A computer program product for performing predictive maintenance of a monitored system, the computer program product comprising at least one non-transitory computer-readable storage medium having computer-readable program code portions stored therein, the computer-readable program code portions configured to:

obtain a training telemetry data object corresponding to telemetry data indicative of time-series sensor measurement data collected from a plurality of sensors of the monitored system;

determine, based on the training telemetry data object, a training input data object which is in a data format defined by an input structure of a predictive maintenance convolutional neural network, wherein the training input data object comprises one or more training input channels which are based on a type of the training input data object, and wherein each training input channel is associated with a sensor from amongst the plurality of sensors and based on a subset of the telemetry data;

obtain a maintenance data object for the monitored system, wherein the maintenance data object identifies one or more maintenance-critical timestamp of the time-series sensor measurement data; and generate, based on the training input data object and the maintenance data object, a trained predictive maintenance convolutional neural network, wherein the trained predictive maintenance convolutional neural network is configured to process a predictive input data object for the monitored system to generate a maintenance prediction for the monitored system.

13. The computer program product of claim 12, wherein the computer-readable program code portions are further configured to:

obtain a predictive telemetry data object corresponding to predictive telemetry data indicative of predictive time-series sensor measurement data associated with the plurality of sensors of the monitored system;

determine, based on the predictive telemetry data object, a predictive input data object, wherein the predictive input data object comprises one or more predictive input channels, and wherein each predictive input channel of the one or more predictive input channels is associated with the sensor of the plurality of sensors, and further wherein each predictive input channel of the one or more predictive input channels is determined based on a first subset of the predictive time-series sensor measurement data associated with the sensor for the predictive input channel; and process the predictive input data object in accordance with the trained predictive maintenance convolutional neural network to generate the maintenance prediction for the monitored system.

14. The computer program product of claim 13, wherein the monitored system is a heating, ventilation, and air-conditioning system.

15. The computer program product of claim 13, wherein the trained predictive maintenance convolutional neural network is generated using a gradient descent training routine.

16. A computer-implemented method for performing predictive maintenance of a monitored system, the computer-implemented method comprising:

obtaining a predictive telemetry data object corresponding to telemetry data indicative of predictive timeseries sensor measurement data associated with a plurality of sensors of the monitored system;

determining, based on the predictive telemetry data object, a predictive input data object which is in a data format defined by an input structure of a predictive maintenance convolutional neural network, wherein the predictive input data object comprises one or more predictive input channels which are based on a type of the predictive input data object, and wherein each predictive input channel is associated with a sensor from amongst the plurality of sensors and based on a subset of the telemetry data; and processing the predictive input data object in accordance with a trained predictive maintenance convolutional neural network to generate a maintenance prediction for the monitored system.

17. The computer-implemented method of claim 16, further comprising:

for each predictive input channel of the one or more predictive input channels, determining a per-input-channel weight value for the predictive input channel with respect to a target classification category associated with the maintenance prediction, wherein the maintenance prediction describes at least one of: one or more affected hardware devices of a plurality of existing hardware devices associated with the monitored system and one or more predicted maintenance need dates for the monitored system; and generating a per-input-channel heatmap for the predictive input channel based on the per-input-channel weight value for the predictive input channel and a feature map for the predictive input channel, wherein the per-input-channel heatmap for the predictive input channel indicates a per-component predictive significance value for each component of a plurality of components of the predictive input channel.

18. The computer-implemented method of claim 17, wherein generating the per-input-channel heatmap for the predictive input channel comprises:

determining a per-input-channel activation output based the per-input-channel weight value for the predictive input channel and the feature map the predictive input channel; and applying an activation function to the per-input-channel activation output to generate the per-input-channel heatmap for the predictive input channel, and wherein the activation function is a rectified linear unit activation function.

19. The computer-implemented method of claim 17, wherein generating the per-input-channel heatmap for the predictive input channel comprises performing guided backpropagation.

20. The computer-implemented method of claim 16, wherein generating the trained predictive maintenance convolutional neural network comprises:

obtaining a training telemetry data object corresponding to telemetry data indicative of time-series sensor measurement data collected from the plurality of sensors of the monitored system;

determining, based on the training telemetry data object, a training input data object, wherein the training input data object comprises one or more training input channels, and wherein each training input channel of the one or more training input channels is associated with the sensor of the plurality of sensors, and further wherein each training input channel of the one or more training input channels is determined based on a first subset of time-series sensor measurement data associated with the sensor for the training input channel;

obtaining a maintenance data object for the monitored system, wherein the maintenance data object identifies one or more maintenance-critical timestamp of the time-series sensor measurement data; and generating, based on the training input data object and the maintenance data object, a trained predictive maintenance convolutional neural network.

* * * * *